Figure 1:
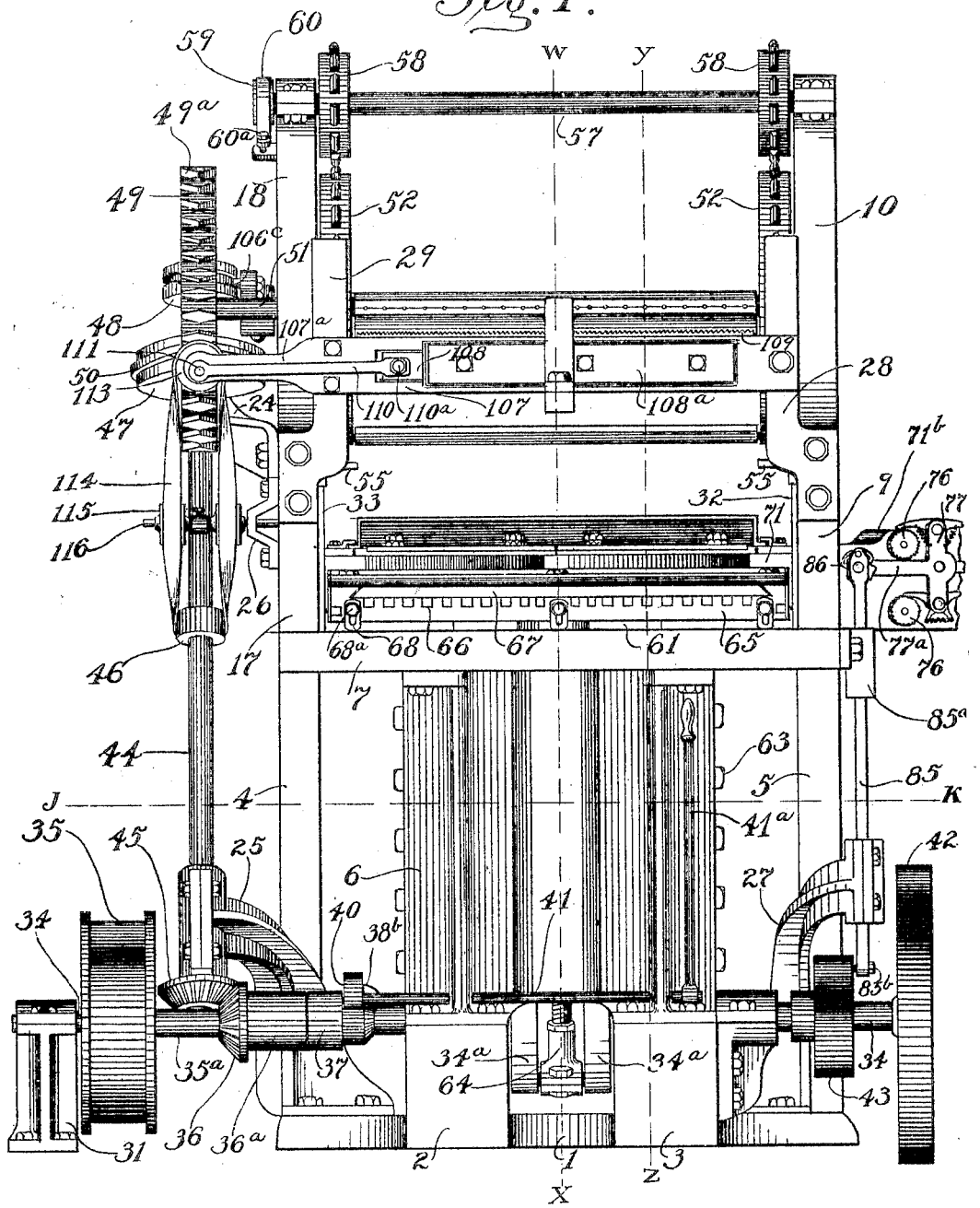

No. 797,697. PATENTED AUG. 22, 1905.
J. W. LUNDGREN & A. J. BELL.
MATCH MAKING MACHINE.
APPLICATION FILED JAN. 11, 1904.

10 SHEETS—SHEET 1.

Witnesses
Wellington K. Blewitt
Charles S. Olson

Inventors
John W. Lundgren
Alfred J. Bell
by James T. Watson
Their Attorney

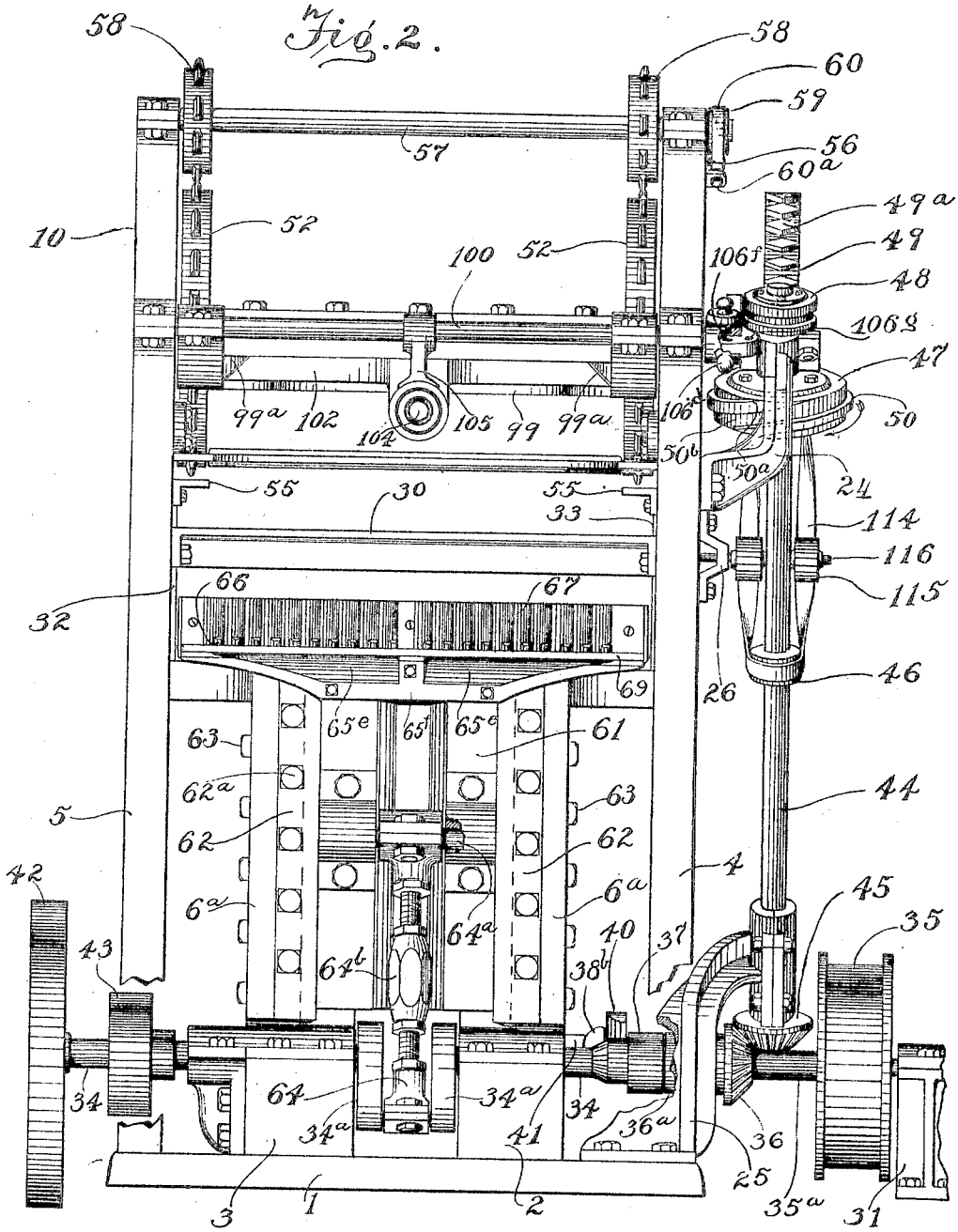

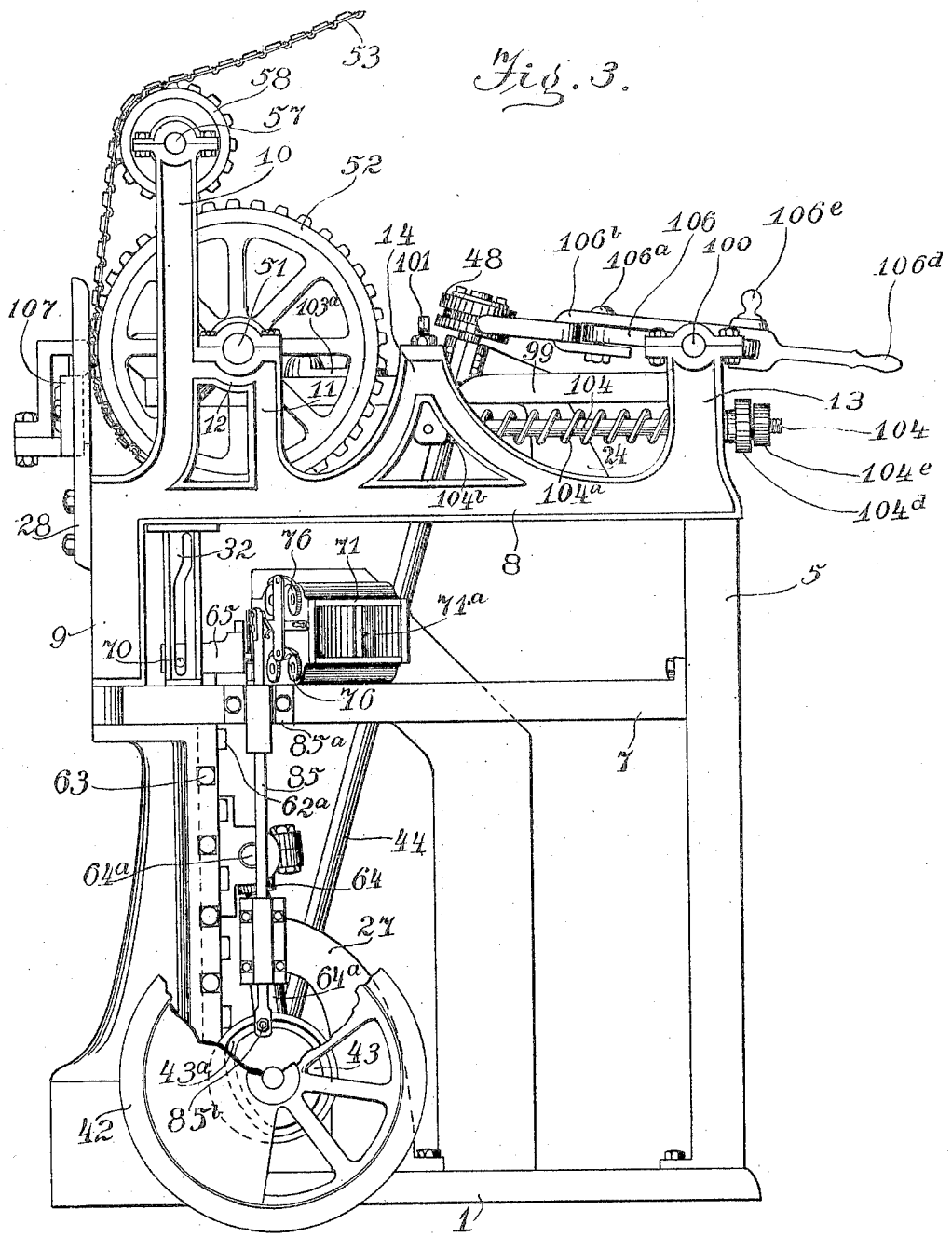

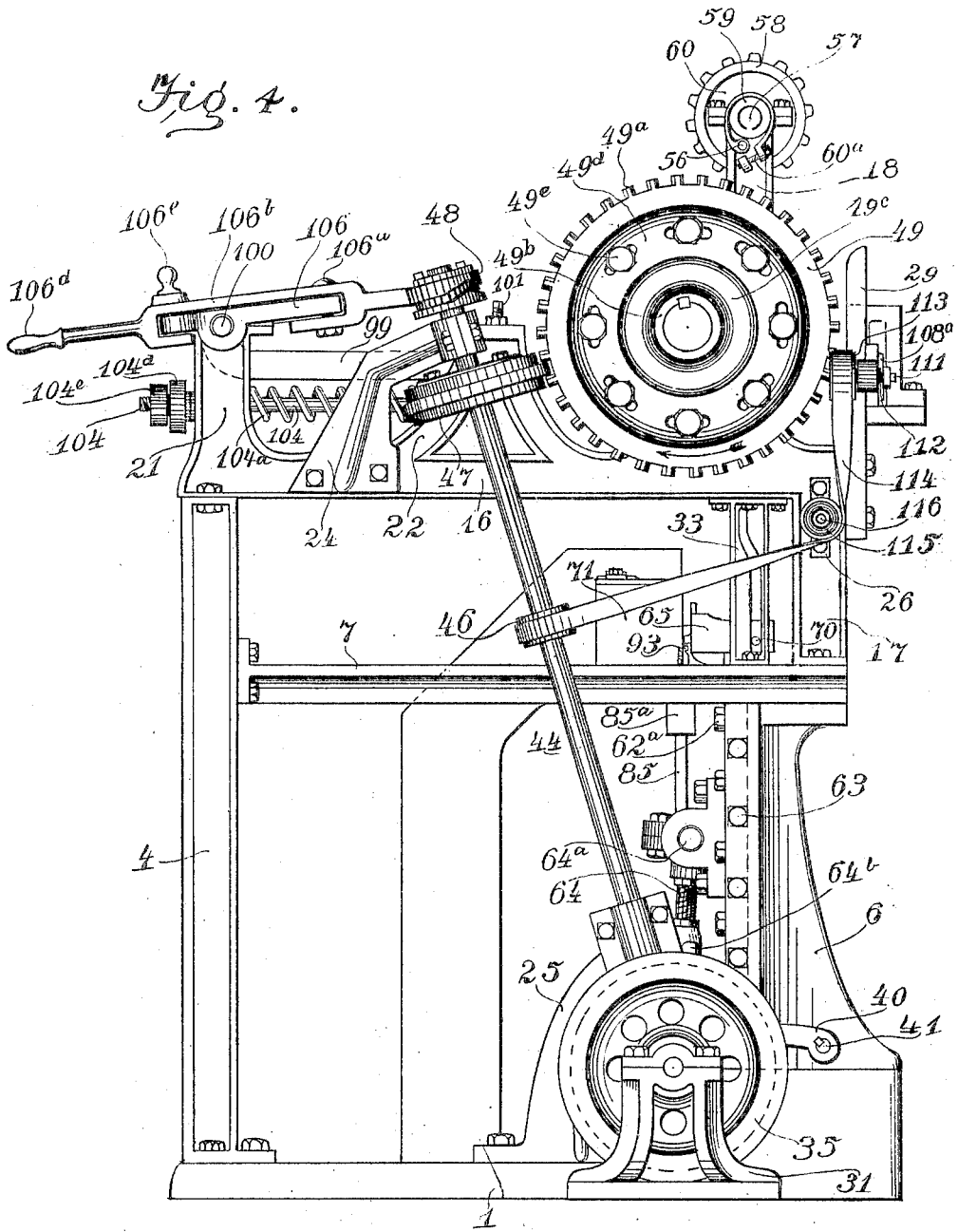

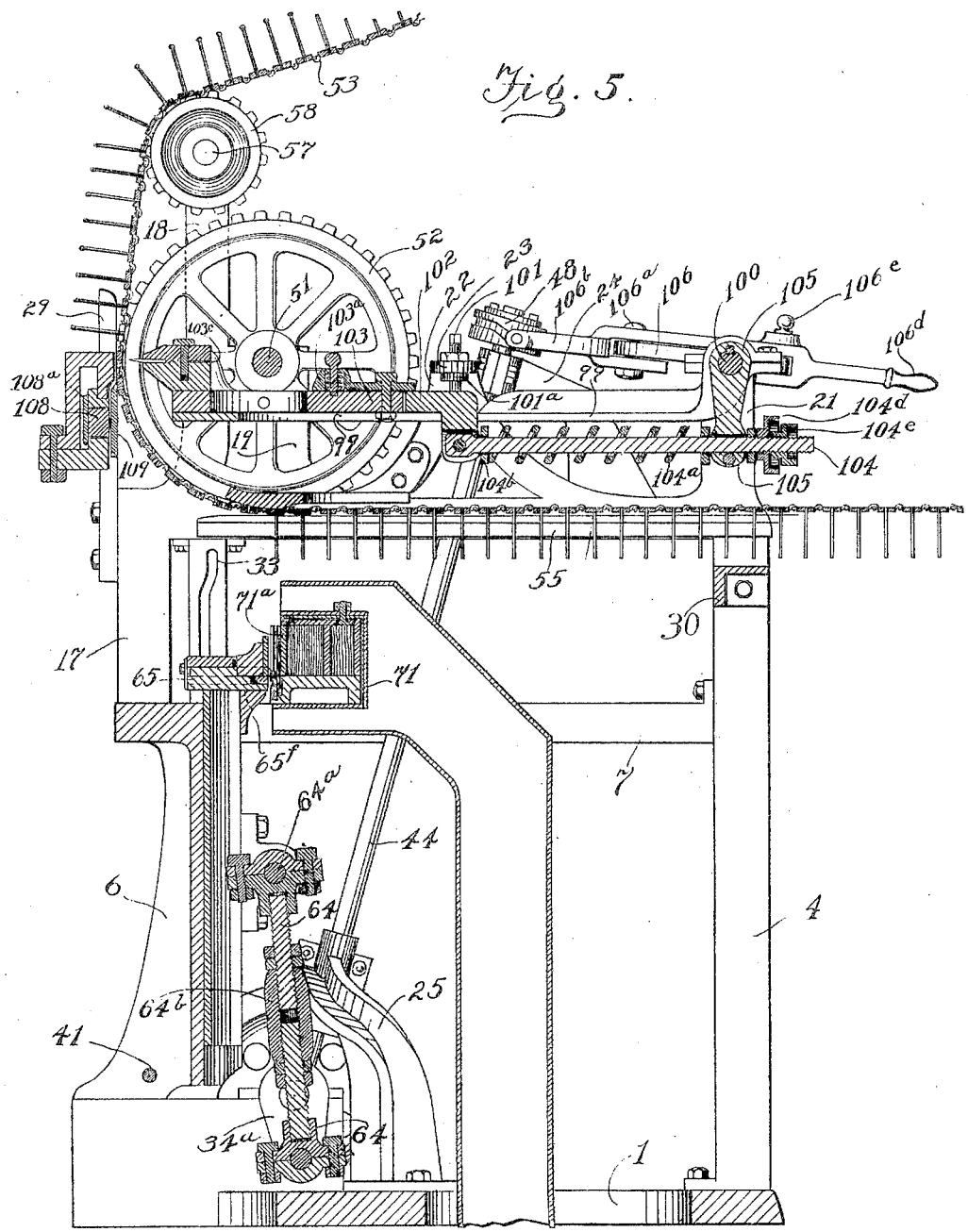

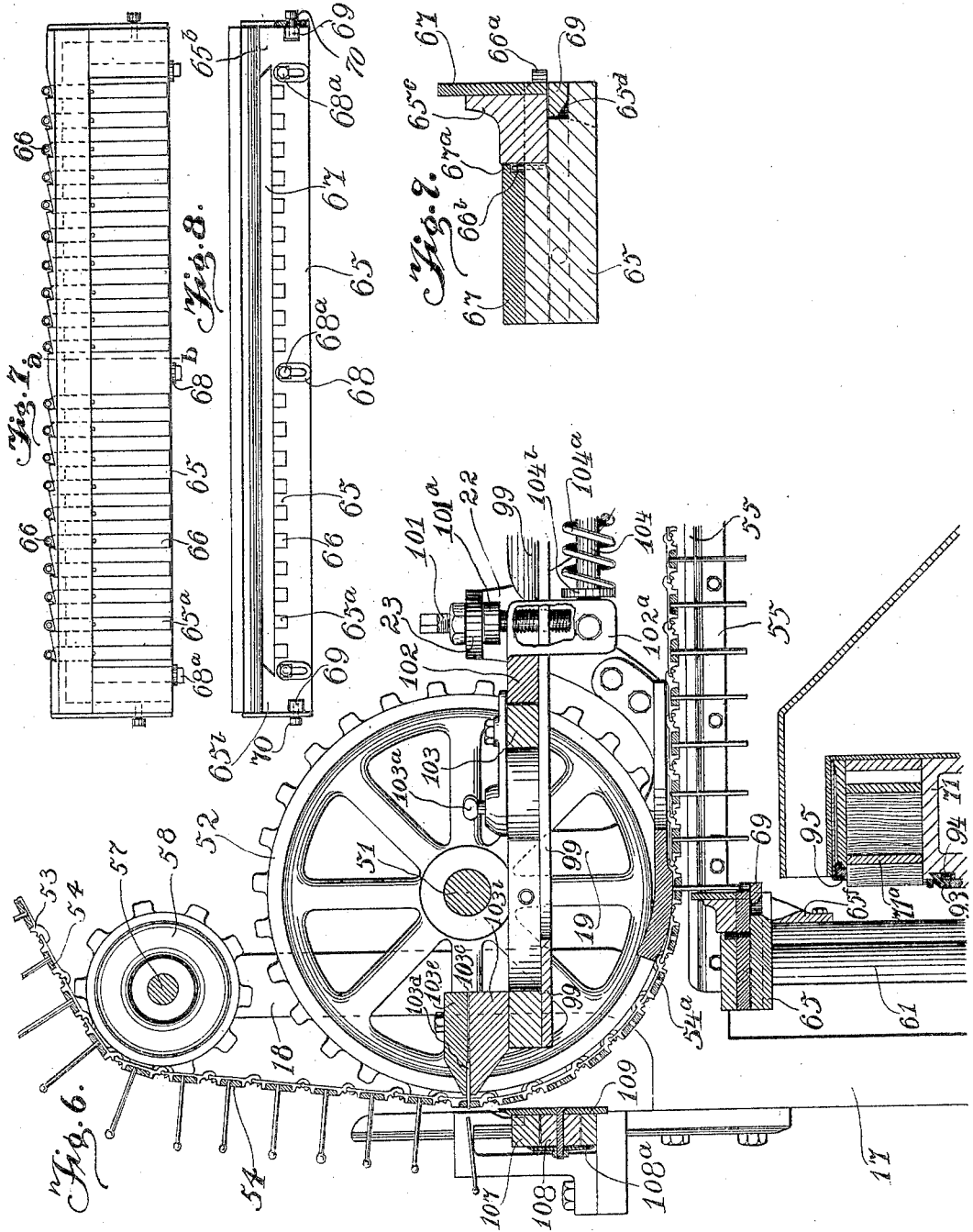

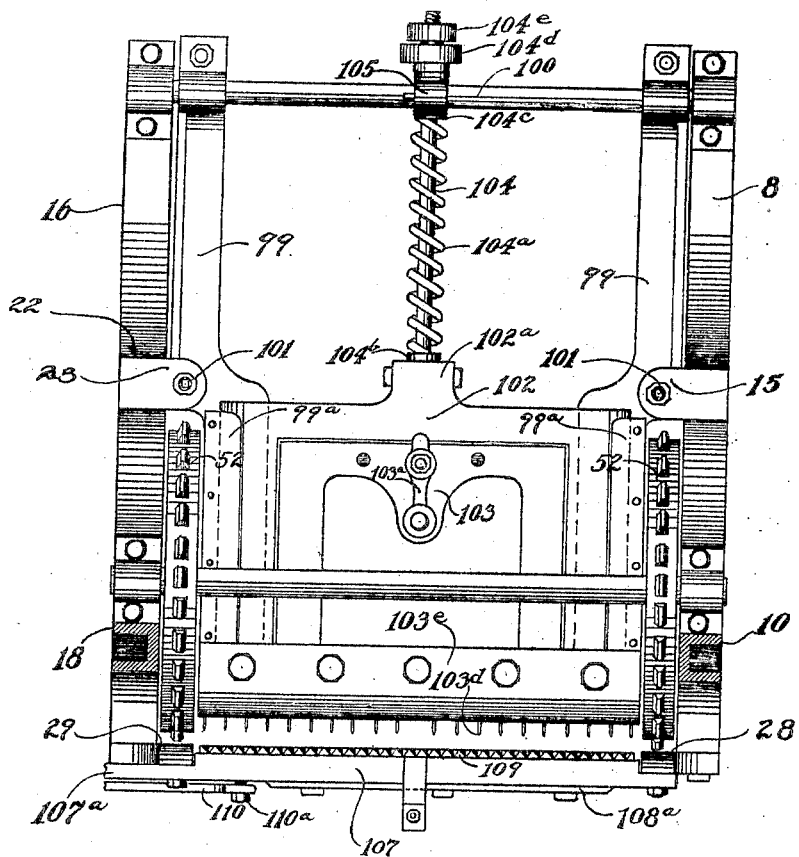

No. 797,697. PATENTED AUG. 22, 1905.
J. W. LUNDGREN & A. J. BELL.
MATCH MAKING MACHINE.
APPLICATION FILED JAN. 11, 1904.
10 SHEETS—SHEET 8.
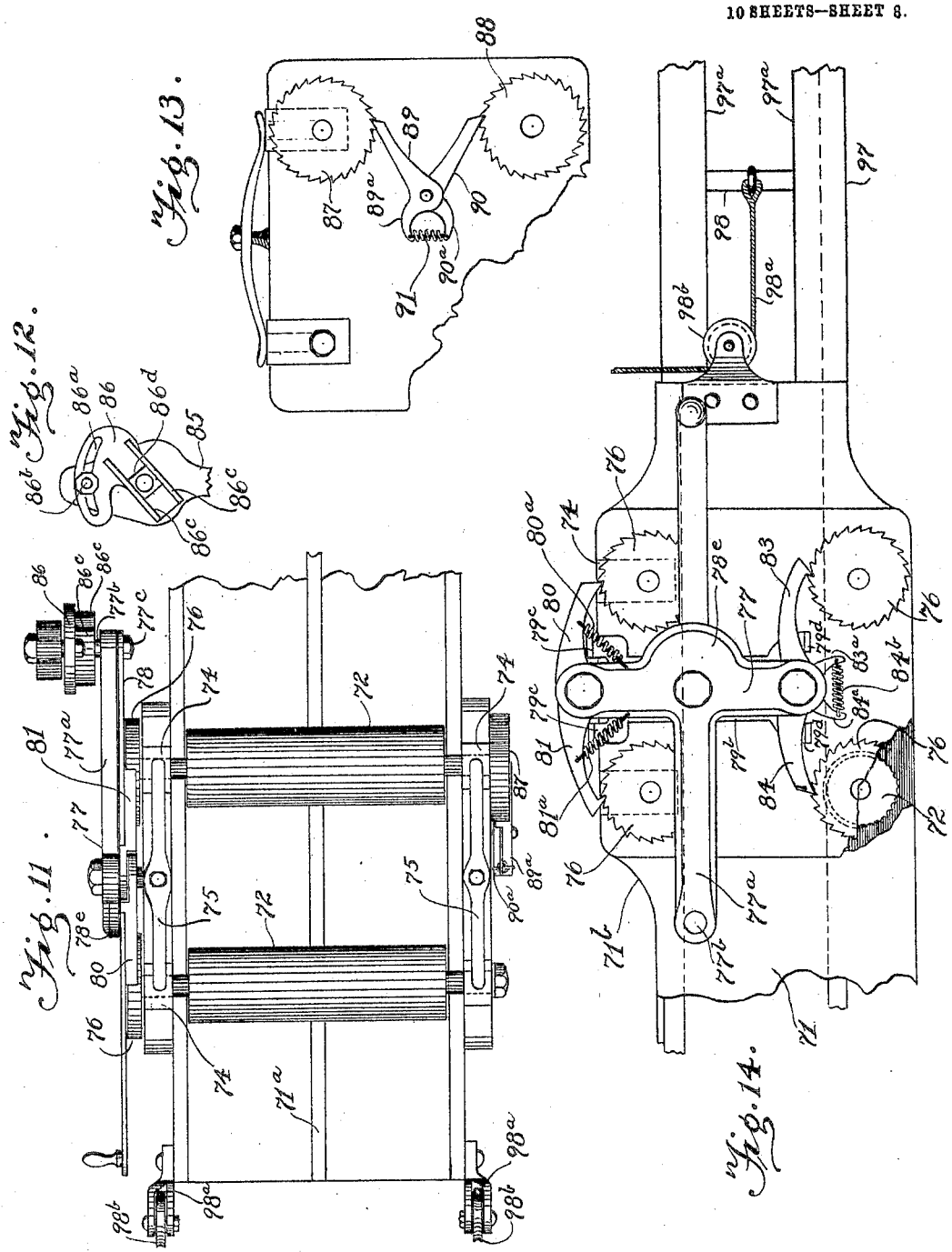

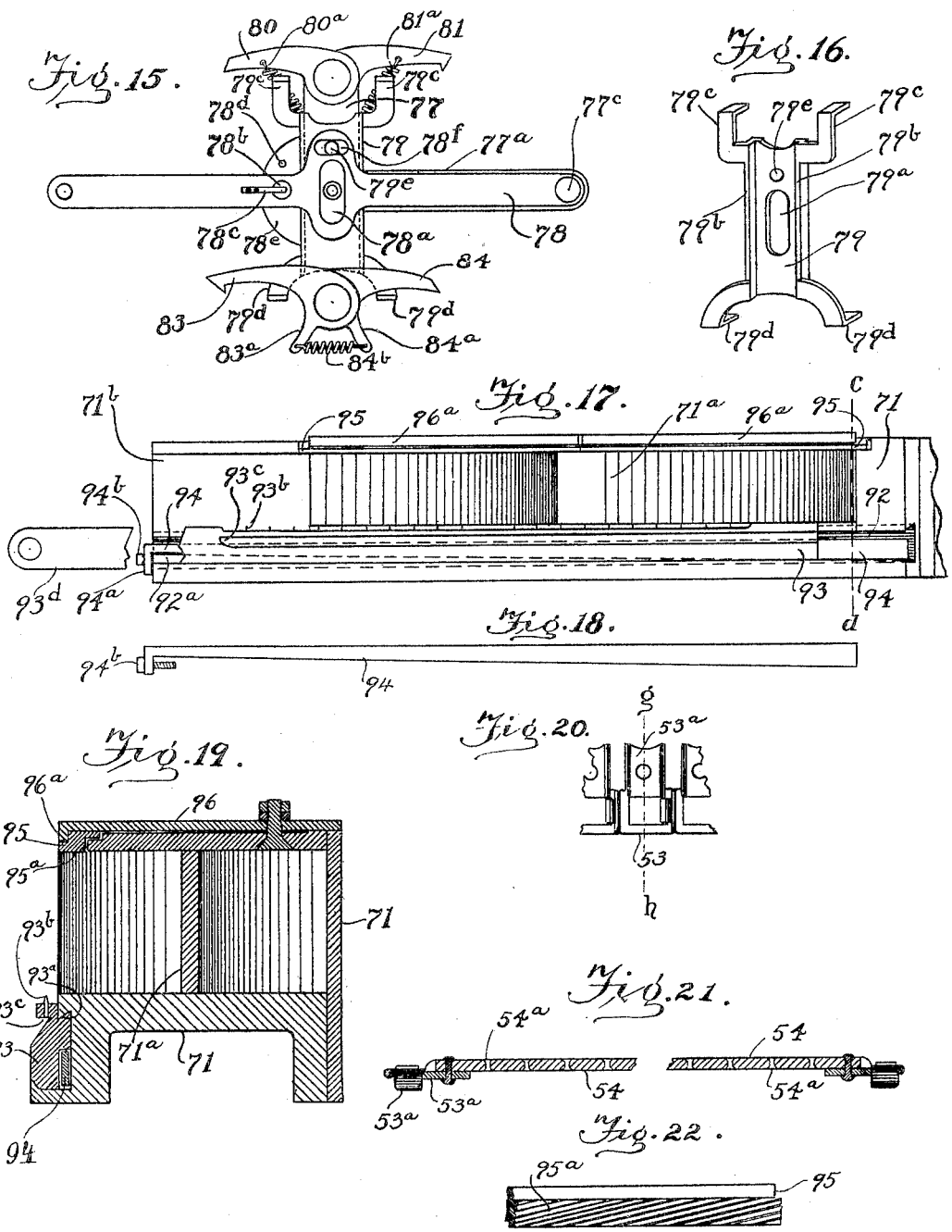

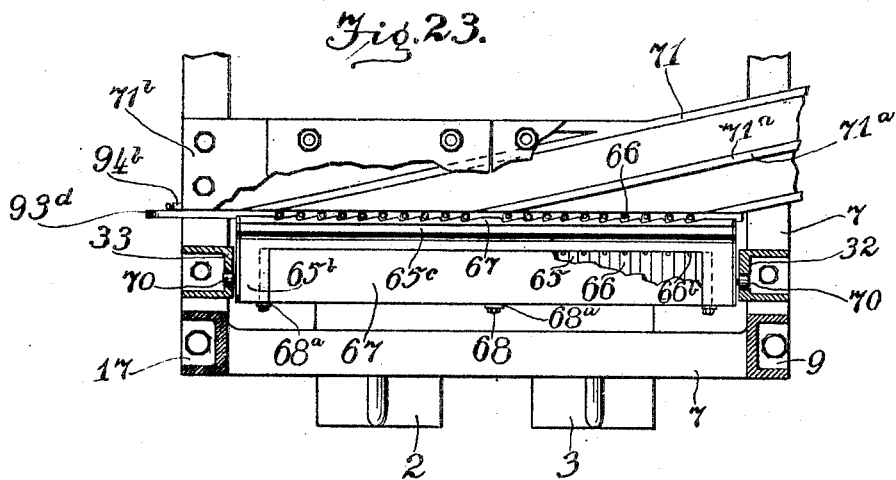

UNITED STATES PATENT OFFICE.

JOHN W. LUNDGREN, OF DULUTH, MINNESOTA, AND ALFRED J. BELL, OF OSWEGO, NEW YORK.

MATCH-MAKING MACHINE.

No. 797,697. Specification of Letters Patent. Patented Aug. 22, 1905.

Application filed January 11, 1904. Serial No. 188,440.

*To all whom it may concern:*

Be it known that we, JOHN W. LUNDGREN, a citizen of the United States, residing at Duluth, in the county of St. Louis and State of Minnesota, and ALFRED J. BELL, residing at Oswego, New York, have invented certain new and useful Improvements in Match-Making Machines; and we do hereby declare the following to be a full, clear, and exact description of the invention, such as will enable others skilled in the art to which it appertains to make and use the same.

Our invention relates to match-making machines, and has for its object the provision of a machine in which several of the parts can be readily disconnected when temporarily not required in use without affecting the operation of other parts.

It also has for a further object the arrangement of the parts so that they can be readily and speedily reached for adjustment or repair.

It also has for a further object the arrangement of parts and provision of means by which clogging of the machine at the front and whereby the risk of accidental fires at that point are obviated.

With these and other objects in view it consists of the constructions, combinations, and arrangements of parts, as will be hereinafter described and claimed.

In the drawings, Figure 1 is a front elevation of said machine, omitting the conveyer-belt. Fig. 2 is a rear elevation of the same, partly broken away, omitting the dust-conveyer and the block conduit-box and the post 27 and 85. Fig. 3 is a right side elevation of said machine. Fig. 4 is a left side elevation of the same. Fig. 5 is a vertical section (with the conveyer-belt added) on the line $w$ $x$ of Fig. 1. Fig. 6 is an enlarged vertical section of a portion of said invention (with the covneyer-belt added) on the line $y$ $z$ of Fig. 1. Fig. 7 is an enlarged top plan view of the cutter-head. Fig. 8 is an enlarged rear elevation of the cutter-head. Fig. 9 is an enlarged vertical transverse section of the cutter-head on the line $a$ $b$ of Fig. 7. Fig. 10 is a top plan view of said machine, omitting the conveyer-belt and omitting all parts extending to the right or left of the sills 8 and 16, respectively. Fig. 11 is an enlarged top plan view of a portion of the block conduit-box and feed mechanism mounted thereon, omitting the cover of said box. Fig. 12 is an enlarged side elevation of the head of the reciprocating arm 85 and of the bearing-plate secured thereto. Fig. 13 is a similarly-enlarged side elevation of a portion of said conduit-box. Fig. 14 is a similarly-enlarged side elevation of a portion of the opposite face of said conduit-box, partly broken away, and of the parts mounted thereon and including a drag and portions of the supports therefor. Fig. 15 is an enlarged elevation of a portion of the driving mechanism mounted on said conduit-box. Fig. 16 is a similarly-enlarged perspective of the slide embodied in the mechanism shown in Fig. 15. Fig. 17 is an enlarged front elevation, partly broken away, of the discharging end of said block conduit-box. Fig. 18 is a similarly-enlarged vertical longitudinal view of a wedge. Fig. 19 is a similarly-enlarged vertical transverse section through the discharging end of said conduit-box on the line $c$ $d$ of Fig. 17. Fig. 20 is an enlarged top plan view of a portion of the match-conveyer belt. Fig. 21 is a similarly-enlarged vertical longitudinal section of the same and additional portions of said belt on the line $g$ $h$ of Fig. 20. Fig. 22 is a bottom plan view of a portion of a pressure-block. Fig. 23 is a top plan view of a portion of the forward end of said machine, partly in section and partly broken away. Fig. 24 is an enlarged vertical transverse section through the gear-wheel 49. Fig. 25 is an enlarged vertical longitudinal section through a portion of said shaft 34 and certain parts mounted thereon, and Fig. 26 is a horizontal section of a portion of said invention on the line $j$ $k$ of Fig. 1.

As shown in the drawings, said machine includes a rigid frame of any suitable construction, preferably comprising a base-plate 1, having shoulders 2 and 3 formed thereon; rear corner-posts 4 and 5; a central front post 6; a sill 7, extending across the front of said front post and rearwardly to said rear corner-posts and secured to each of said posts; an upper sill 8 at the right-hand side of said frame, extending forwardly from the rear corner-post thereof to the forward corner of the lower sill and provided with a leg 9, standing upon the forward corner of said lower sill, and further provided near its forward end with an upwardly-directed post 10 and a shorter upwardly-directed post 11, preferably connected together by a web 12, said sill having formed thereon at its rearward end an upwardly-extending post 13 and intermediate of said posts 11 and 13 a shoulder 14, having a transversely-directed lip 15 formed thereon, which upper sill is rigidly secured in any suitable manner to said post 5 and to the forward corner of said lower sill; an upper sill 16 at the left-hand side of said frame, extending from the post 4 forwardly to the forward corner of the lower sill and provided at its forward end with a leg 17, standing upon the forward corner of said lower sill and provided at its said forward end with a post 18 and a shorter post 19, preferably connected together by a web 20, said sill having formed thereon at its rearward end a post 21 and intermediate of said posts 19 and 21 a shoulder 22, having a transversely-directed lip 23 formed thereon; a bracket 24, secured to the outer face of said sill 16; a post-bracket 25, erected upon said base-plate; a bracket 26, secured to said leg 17; a post-bracket 27, erected upon said base-plate; brackets 28 and 29, secured to the forward faces of said legs 9 and 17, respectively; a brace 30, extending from one to the other of said posts 4 and 5 and secured thereto; a bracket or post 31, erected upon said base-plate or upon any suitable independent foundation; a guide 32, secured to said sills 7 and 8; a guide 33, secured to said sills 7 and 16. Said frame also consists of certain other parts, as will hereinafter appear.

Journaled in bearings of any suitable construction formed on or secured to said post 31 and said shoulders 2 and 3 is a crank-shaft 34 of any suitable construction, the crank-arms $34^a$ of which extend between said shoulders 2 and 3. A belt-wheel 35 or other suitable drive-wheel provided with an extended hub $35^a$ is journaled upon a diametrically-reduced end of said shaft, and upon the inner end of said hub is keyed a gear-wheel 36, provided with an extended hub $36^a$. The central aperture of said hub $36^a$ is preferably reduced at the inward end to form a web extending across the end of said hub $35^a$ and bearing upon said reduced portion of said shaft and against a shoulder formed by the thicker portion of said shaft. A recess $36^b$ is formed in the inward face of said hub $36^a$, and adjoining said hub $36^a$ there is keyed upon said shaft a collar 37, having a channel formed therethrough for the passage of a sliding key 38. Said key is also let into a channel $34^a$, formed in said shaft, and is provided on its lower face with a shoulder $38^a$, adapted to bear against a coiled spring 39, positioned between said lug and the inner end wall of said channel, which spring operates to thrust said sliding key along said channels and into the recess $36^b$. Upon the inner end of said sliding key is formed a finger $38^b$, by which said key may be withdrawn from said recess $36^b$. In order to retract said key from said recess, there is provided a dog 40, adapted at one end to operate as a wedge between the side of said collar 37 and said finger $38^b$ and keyed at the other end to a rock-shaft 41, journaled in ribs formed upon the forward face of said central post or in any suitable supports and having an operating-lever $41^a$ keyed thereto. It will thus be seen that upon retracting said lever the transmission of power from said belt-wheel to said shaft 34 will be suspended. Upon the opposite end of said shaft 34 is preferably keyed a balance-wheel 42, and intermediate of said balance-wheel and the center of said shaft there is keyed thereto a wheel 43, having a cam-groove $43^a$ formed in one side face thereof. Journaled in suitable bearings formed upon or secured to said brackets 24 and 25, respectively, is an upwardly and rearwardly inclined shaft 44, at the lower end of which is keyed a pinion 45, adapted to engage said gear-wheel 36. Intermediate of the ends of said shaft there is keyed thereto a belt-wheel 46, and above the latter wheel there is keyed to said shaft a worm-wheel 47. At the upper end of the last said shaft there is keyed thereto a cam-wheel 48. Engaging said worm-wheel is a gear-wheel 49, provided upon its periphery with diamond-shaped teeth $49^a$. Said wheel 49 preferably comprises a hub $49^b$, provided with an external flange $49^c$, and a rim 49, provided with an internal flange $49^d$, overlapping said flange $49^c$ and bolted thereto through slotted apertures in one or the other, or both, of said flanges, as at $49^e$. It will thus be seen that when the teeth on said rim portion become worn on one side said rim portion may be detached and turned over and reattached to said hub portion, thereby presenting new surfaces to the action of said worm, or said rim may be rotatably adjusted with respect to said hub. The wheel 47 is provided with a circumferential thread or worm 50, which for the major part of its course lies in or is parallel to the central radial plane of said wheel, but is parted at its ends, and one end, as $50^a$, is deflected toward the side of the wheel and prolonged sufficiently to extend to or beyond an imaginary line drawn across the opposite end of said thread. The opposite end of said thread may also, if desired, be prolonged and deflected in similar manner, but toward the opposite side of said worm-wheel. The passage $50^b$ thus formed between the ends of said thread is of a proper width to receive one of said teeth $49^a$, and said thread is of a proper width to fill the space between the opposite central points of any two of said teeth $49^a$. It will thus be seen that during the major part of its revolution in the direction of the arrow marked thereon said thread or worm has no effect to move said wheel 49, but rather a restraining effect upon the same; but during the remainder of its revolution—namely, when any one of said teeth $49^a$ bears against the outer side of the deflected end 50ª of said thread—said worm will operate to turn said wheel 49 in the direction of the arrow marked thereon. Said wheel 47 is further preferably constructed of an externally-flanged hub keyed to said shaft and an internally-flanged rim bearing said thread and adjustably secured to the external flange of said hub in similar manner to the assembling of the parts of the wheel 49.

The wheel 49 is keyed to a shaft 51, journaled in suitable bearings formed upon or secured to the posts 11 and 19, respectively, to which shaft, near the opposite sides of said machine, are also keyed sprocket-wheels 52, of similar construction to each other, the teeth of which are adapted to engage the links of parallel endless sprocket-chains 53. The links of said chains are respectively provided with inwardly-extending shelves or brackets 53ª, upon which are seated and secured conveyer-bars 54, extending from one to the other of said chains. Each of said bars has formed therein a row of apertures 54ª, which are preferably countersunk or bell-mouthed at each side of the bar and which are adapted at the outer side of the bar to receive the ends of match-sticks and at the inner side of the bar to subsequently receive punches for ejecting said sticks. Said chains and bars comprise an endless match-conveying belt adapted to travel forwardly and downwardly over and beneath said wheels 52 and rearwardly along narrow supporting-shelves 55, secured to the frame of said machine, thence supported and guided by any suitable or desirable means to a turning-point at a distance from said machine, and thence supported and guided by any suitable and desirable means back to said frame, passing in route or circuit any suitable paraffin and composition tanks and dipping the match-sticks therein, certain constructions of said guiding and supporting means and tanks being well known to the art and not thought necessary to be herein described.

Journaled in bearings of any suitable construction formed on or secured to the posts 10 and 18 is a shaft 57, near each end of which are keyed thereto sprocket-wheels 58, adapted, respectively, to engage the links of the chains 53 from the inner side before said chains are engaged by the wheels 52. Upon one end of said shaft is keyed a brake-wheel 59. A brake-strap 60 is secured at one end in any suitable manner to said post and is carried partly around said brake-wheel and adjustably secured at its opposite end to said post, as by an adjusting-bolt 60ª. The wheels 58 are thus adapted to yieldingly resist the pull of said wheels 52 on said chains and to keep the chain taut at the forward end of the loop. Positioned in vertical guides formed in or secured to the rear face of said post 6 is a vertically-movable slide 61, which is secured therein by adjusting-bars 62, forming part of said guides, which bars are beveled upon their inner edges to engage or overlap the oppositely-beveled side edges of said slide and are adjustably secured to said post by bolts 62ª, projected through horizontally-slotted apertures in said bars and into threaded apertures in said post. Set-screws 63 are projected through threaded apertures in flanges 6ª, formed on said posts, and against the opposite edges of said bars 62. The wear on the latter bars or upon the engaged edges of said slide may thus be compensated by loosening said bolts 62ª, forcing said bars transversely inward by means of said set-screws, and again tightening said bolts.

A pitman 64 is journaled at one end upon a shaft 64ª, secured in any suitable manner to said slide 61, and at the opposite end is journaled on the crank-pin of said crank-shaft 34. Said pitman preferably comprises two alined members, having right and left threads cut upon their opposing ends, respectively, and connected by a turnbuckle 64ᵇ, whereby said pitman may be shortened or lengthened. Upon the upper end of said slide 61 is mounted a cutter-head comprising a rectangular table 65, having a row of forwardly and rearwardly extending knife-spacing channels 65ª formed in its upper face, upwardly-turned flanges 65ᵇ, extending along its ends and grooved or inwardly beveled in their opposing faces, a shoulder 65ᶜ, provided upon its upper face at its rearward edge and channeled in its lower face in continuation of the first said channels. Said table also has a groove 65ᵈ formed in its end and rear faces, the top of which groove is slightly below or on the same plane with the floors of said channels. The channels 65ª are adapted to receive the shank portions or hilts of a row of knives 66, the cutting ends of which are adapted to extend rearwardly beyond the rearward edge of said table and partly beyond a vertically-corrugated plate 67, secured to the rear face of said shoulder, the indentations or corrugations in which plate are adapted to receive or steady in vertical position the sticks cut by said knives from blocks hereinafter described. The knives 66 may be substantially of a pattern well known to the art and are provided with downwardly-directed cylindrical cutting edges 66ª, said cylindrical portions being open at each end. The shank of each of said knives is recessed or apertured to receive a corresponding stop-pin 66ᵇ, which when said knife is in operative position is adapted to bear against the forward face of said shoulder and prevent the further rearward extension of said knife. A slide-cover 67, provided with an overhanging lip 67ª at its rearward edge, is in operative position projected into the grooves in said flange 65ᵇ and over said knife-hilts until said overhanging lip extends over said stop-pins and the edge of said stop-cover below said lip bears against said pins. Said cover is locked in operative position by any suitable means and preferably by slotted washers 68, secured to the forward edge of said table by bolts or screws $68^a$, and in operative position adapted to bear against the front edge of said cover. In said groove $65^d$ is positioned an abutment-slide 69, extending along the rear edge of said table and along the ends thereof and adapted to be extended rearwardly into operative position immediately beneath the cutting edges of said knives and subsequently to be retracted wholly within said groove. In operation said abutment-slide is projected during the latter part of the upward movement of said cutter-head and is retracted during the first part of the downward movement thereof before said knives reach the plane of the upper surface of the blocks from which sticks are to be cut. To effect the projection and retraction of said abutment-slide, there are journaled upon pins projecting from the sides of said abutment-slide wheels or rollers 70, adapted to travel in slots formed in said guides 32 and 33, respectively, which slots are so formed as to cause the projection or retraction of said abutment-slide at the proper moment. When said abutment-slide is retracted, it will be seen that the cutting edges of said knives are exposed for operation upon said blocks during the downward stroke and that during the upward stroke said abutment will be projected closely under said knives to prevent the match-sticks carried thereby from being driven downward through said knives rather than upward into the apertures in one of said bars 54 registering therewith. The floor of said groove $65^d$ is preferably cut away intermediate of the center and ends of said table, as at $65^e$, to form an escape for dust which may be carried into said groove. A supporting-plate $65^b$, correspondingly cut away at its upper edge, is preferably secured to said slide 61 beneath the rear edge of said table. Extending obliquely into said frame from one side and supported in any suitable manner or by any suitable means is a conduit-box 71, preferably divided longitudinally by a vertical partition $71^a$ to form two conduits therein, adapted to convey previously-prepared blocks into the path of said knives. The movement of said blocks along said conduits is intermittently effected by the following described means: Journaled in housings formed by a vertical enlargement of said conduit-box, as at $71^b$, and extending across said conduits are pressure or feed rolls 72, preferably corrugated parallel with their axes, the peripheries of which rolls extend only very slightly into said conduits. One or both of the horizontal pairs of said rolls are vertically yielding, for which purpose the axles of said yielding pair or pairs are projected through vertically-slotted apertures in the outer walls of said conduits and are journaled in vertically-yielding journal-boxes 74, mounted in shoulders or brackets formed upon or secured to the outer walls of said conduits. Retaining or pressure springs 75 are secured in any suitable manner to said conduit box or brackets and are adapted to bear upon the upper faces of the upper pair of journal-boxes or upon the lower faces of the lower pair of the same, as the case may be. Upon the axles of each one of said rolls at one side of said conduit-box outwardly from said journal-boxes is keyed a ratchet-wheel 76, the teeth of the upper pair of which are cut in one direction and the teeth of the lower pair of which are cut in the opposite direction. Journaled upon a pin extending outwardly from the face of the conduit wall or shoulder centrally between said ratchet-wheels is a rocker-arm 77, provided on its inner face with a hub concentric with said pin, by which hub said rocker-arm is spaced a short distance from the side of said conduit. Said rocker-arm is provided equidistant from its upper and lower ends with a forwardly-directed operating-lever $77^a$, provided upon the outer face of its forward end with a wrist-pin $77^b$ and upon its inner face with a wrist-pin $77^c$, upon which latter pin is pivoted a lever 78, extending rearwardly parallel with said lever $77^a$ beyond said rocker-arm and having a slotted aperture formed intermediate of its ends, as at $78^a$, adapted to freely inclose the hub of said rocker-arm. Said lever 78 is provided with a spring-button $78^b$ of any suitable construction, preferably comprising a spring $78^c$, secured to the inner face of said lever and carrying said button $78^b$, which is directed through an aperture in said lever and adapted to engage one or another of a series of recesses $78^d$, formed in a flange $78^e$, extending from the edge of said rocker-arm, and thus to lock said lever 78 in any desired position. Between the inner face of said rocker-arm and the outer face of said lever 78 is positioned a vertically-movable slide 79, centrally apertured at $79^a$ to form a free passage for the hub of said rocker-arm and provided at its sides with outwardly-turned guide-flanges $79^b$, adapted to engage the vertical edges of said rocker-arm. Upon the upper end of said slide are formed upwardly-extending arms $79^c$, and upon the lower end of said slide are formed downwardly-extending hooks $79^d$. Said slide is provided on its inner face with a pin $79^e$, adapted to engage a slotted aperture $78^b$ in said lever 78, whereby the movement of said lever on its individual pivot will operate to move said slide vertically. Pivotally secured to said rocker-arm at its upper end on a single pin extending from said arm are two pawls 80 and 81, respectively, the former of which terminates in a chisel-edge pusher-point and the latter of which terminates in a drag-hook, the point of which hook and the tip of which chisel edge are equidistant from the axis of said pivot-pin. Said pawls are respectively adapted to engage the teeth of the upper forward and rearward said ratchet-wheels and are normally kept in engagement therewith by tension-springs $80^a$ and $81^a$, respectively, secured at one end to said pawls and at the other end to said rocker-arm. Pivotally secured to said rocker-arm at the lower end thereof on a single pivot extending from said arm are two pawls 83 and 84, respectively, the former of which terminates in a drag-hook and the latter of which terminates in a chisel-edge pushing-point, the point of which hook and the tip of which chisel-edge point are equidistant from the axis of said pivot-pin. Said pawls are adapted to engage the teeth of the lower forward and rearward said ratchet-wheels, respectively, and are normally kept in engagement therewith by a tension spring $84^b$, interposed between and secured at its opposite ends to heels $83^a$ and $84^a$, formed on said pawls, respectively. The upper said pawls overhang the arms $79^c$, and the lower said pawls overhang the hooks $79^d$, and when said slide 79 is moved upwardly by said lever 78 said arms $79^c$ and hooks $79^d$ will operate to lift said pawls out of engagement with said ratchet-wheels. It is obvious, however, that when said pawls are in engagement with said ratchet-wheels the rocking of said rocker-arm will operate to turn said feed-rolls to feed forwardly the prepared blocks which have been brought into engagement therewith. In order to rock said rocker-bar, there is provided a reciprocating arm 85, mounted in suitable stationary guide-bearings formed on or secured to said post-bracket 27 and to said frame, as at $85^a$, which rod is provided at its lower end with a pin $85^b$, adapted to extend into the cam-groove $43^a$ of said wheel 43. Upon the upper end of said rod is adjustably secured a bearing-plate 86, having a slotted aperture $86^a$ formed therein, through which extends a bolt $86^b$, by which said plate is secured to said reciprocating arm. Guide-flanges $86^c$ are provided upon one face of said plate, between which flanges is slidably positioned a bearing-block $86^d$, centrally recessed or apertured to receive the pin $77^b$. It is obvious that the degree of movement or throw of said rocker-arm is adapted to be governed by the angle of the guide-flanges directing said block $86^d$, such angle being fixed by the position of said bolt $86^b$ in said slot. It will also be observed that the rotation of said feed-rolls may be suspended either by disengaging said pawls or by adjusting the throw of said rocker-arm to zero or by retracting said sliding key 38. In order to prevent any slip or counter rotation of said feed-rolls, there is keyed to the axles of either vertical pair of them ratchet-wheels 87 and 88, the teeth of which respectively are oppositely directed. Pivoted upon a single pin are dogs 89 and 90, adapted to engage said wheels 87 and 88 and kept in engagement therewith by a tension-spring 91, interposed between and secured to heels $89^a$ and $90^a$, formed upon said dogs. Said conduit-box extends forwardly nearly to the plane of movement of said cutter-head and is beveled at its mouth from side to side, so that it will present an open end parallel with the plane of movement of said cutter-head. The base of said conduit at said open end has formed therein a dovetail groove 92, continued along the forward face of a shoulder $71^b$, formed on said conduit-box and adapted to receive a pin-slide 93, which slide is provided with a groove $93^a$, formed in its upper edge to receive the upper lip of said dovetail groove, and is beveled at its outer lower edge to bear against the lower flange of said dovetail groove. Upon the back wall of said groove 92 is formed a longitudinally-inclined shoulder $92^a$, adapted to support a wedge 94, upon the smaller end of which wedge is formed a finger $94^a$, having a threaded aperture formed therein for the passage of a set-screw $94^b$, adapted to bear against the end of said shoulder $71^b$. The lower rear edge of said pin-slide is grooved to receive said shoulder $92^a$ and the wedge lying thereon; but the latter groove is only of sufficient vertical depth to permit of said wedge being drawn a short distance up said inclined shoulder. It is thus obvious that when said wedge is projected to the farthest limit in said groove said pin-slide may be longitudinally adjusted so that the pins $93^b$ carried thereby may be respectively brought into registration with corresponding knives, and when so adjusted said wedge may be drawn up said incline to wedge said pin-slide in such position. It is also obvious that said slide may be readily removed to replace broken pins or for any other desired purpose. The forward face of said pin-slide is preferably channeled, as at $93^c$, to a depth sufficient to expose half the diameter of each of said pins $93^b$, so that the same may in case of need be struck upward from below with a punch. In operation when said knives descend with contained matchsticks to the lowest limit of the stroke said pins $73^b$ will extend into the cylinders of said knives and punch said sticks upwardly in the same, thus loosening them in a degree and facilitating their withdrawal from the knives, when they are subsequently inserted at their opposite ends in the apertures $54^a$ of said conveyer-bars. Said pin-slide is provided with a handle portion $93^d$. The upper forward edge of said conduit-box is cut away at each side of the central partition to receive pressure-blocks 95, extending flush with the vertical plane of the lower forward edge of said conduit-box, which pressure-blocks are preferably indented in their forward edges to receive fingers $96^a$, formed upon the ends of pressure-springs 96, which springs are secured in any suitable manner to the upper faces of said pressure-blocks and at their opposite ends to said conduit-box and are adapted to bear down on said pressure-blocks, which are thus adapted to prevent the upper edges of thin remnants of match-stick blocks from tipping forward. Said pressure-blocks are corrugated in their lower faces, as at $95^a$, the axes of which corrugations extend parallel with the sides of said conduit-box and further tend to guide and secure the upper edges of said remnants.

In order to present the previously-shaped match-stick blocks to said feed-rolls, there is preferably provided a rearward table extension 97 of said conduit-box, provided on its upper face with suitable guides $97^a$ for conducting said blocks. A drag 98 is slidably mounted on said table, and attached thereto are suitable flexible means, as cords $98^a$, led forward and partly around guide-wheels $98^b$. Weights $98^c$ are suspended from the opposite ends of said cords, whereby said drag is drawn forward toward said rolls, pushing into engagement with said rolls any blocks interposed between the same and said drag. The blocks are then fed along said conduit and projected slightly from the forward end thereof into the path of said knives, which in the descending stroke of said cutter-head cut a row of match-sticks from the face of said blocks and in the upward stroke deliver them in the apertures of one of said conveyer-bars, the endless chains and conveyer-bars being at the time automatically halted by reason of the temporary inability of said worm to operate said wheel 49.

After a conveyer-bar containing finished matches has returned to the front of said machine and during one of said halts they are ejected forwardly from said bar into any suitable receptacle provided for their reception. Their ejectment from said bar is accomplished by a pusher positioned within the loop of said conveyer-belt and comprising a shelf 99, approximately of the shape of a horseshoe, journaled at the heels upon a rock-shaft 100, which shaft is journaled in suitable bearings formed on or secured to said posts 13 and 21. Said shelf extends toward the front of said machine and is adjustably supported at each side intermediate of its toe and heels by suspending-bolts 101, right and left threaded at their opposite ends and extending through and engaging threaded apertures in said shelf and at their opposite end extending loosely through apertures formed in said lips 15 and 23, respectively, and having retaining-nuts mounted upon their upper ends. Said bolts are also provided intermediate of their ends with collars $101^a$, adapted to bear against the lower faces of said lips. Said shelf can thus be radially adjusted in a vertical plane. Upon the upper face of said shelf are provided guides $99^a$, adapted to receive the edges of a frame-slide 102, in which slide is pivotally mounted a tilting table 103, the axis of which is horizontal and parallel with the front of said machine. Said tilting table is normally retained in horizontal position by a latch or button $103^a$, mounted on its upper face and in operative position adapted to impinge upon the edge of said frame 102, and further by the passage of the toe of said shelf beneath and in contact with the forward edge of said tilting table. Upon the upper face of the forward end of said tilting table is provided a shoulder $103^b$, having a row of forwardly and rearwardly directed channels $103^c$ formed in its upper face, adapted in their forward ends to receive approximately half the diameters of a row of punches $103^d$, corresponding in number to the number of apertures in any one of said conveyer-bars and so positioned and adjusted as to register with the apertures of one of said bars containing finished matches during each temporary halt of said conveyer-belt for the purpose of permitting the ejectment of such finished matches. A cover $103^e$, having a row of channels formed in its lower face adapted to receive approximately half the diameters of said punches, is removably secured upon said shoulder $103^b$ in any suitable manner to clamp said punches in operative position. Pivotally secured to a lug $102^a$ formed upon the rear end of said frame-slide, is a connecting-rod 104, supported at its opposite end in a forked eccentric arm 105, keyed to said rock-shaft 100. Mounted on said connecting-rod intermediate of said eccentric arm and said frame-slide is a tension-spring $104^a$, adapted to bear at one end against any longitudinally-fixed abutment on said rod, as a collar $104^b$, and to bear at its opposite end against a loose washer $104^c$, which in turn bears against said eccentric arm. The end of said reciprocating arm extending rearwardly of said eccentric arm carries nuts $104^d$ and $104^e$, adapted to draw said arm through the forked end of said eccentric arm the desired distance and to retain it in such position against the action of said spring and against the drag of said frame-slide. Thus the eccentric arm through the medium of said spring advances said slide into operative position and through the medium of said connecting-rod retracts the same. In case of any accidental obstruction in front of said slide or punches said spring $104^a$ yields sufficiently to avoid damage. Keyed to one end of said shaft 100 is a lever 106, upon the forward end of which, as at $106^a$, is pivotally secured a second lever $106^b$, provided at its forward end with a laterally-extending pin $106^c$, adapted in operative position to engage the annular groove $48^a$ in said cam-wheel 48. The rearward end of said second lever terminates in a handle $106^d$, and near said handle a spring-controlled locking-button $106^e$ of any suitable construction is positioned in said second lever and adapted when the latter lever is in operative position to engage a recess $106^f$ in the upper face of said lever 106 and when said lever 106$^b$ is in retracted position to engage a recess 106$^g$ in said lever 106. The operation of said pusher may thus be suspended by swinging said lever 106$^b$ out of engagement with said groove 48$^a$. The said cam-wheel 48 is so proportioned, constructed, and adjusted as to be capable of rocking the lever engaged therewith only while said conveyer-bars are halted by said worm 50. In the event that any one of said punches 103$^d$ fails in any instance to eject the match against which it is operated it is desirable to immediately remove the retained match by other means to avoid clogging of the machine and to avoid the accidental lighting of said match and the consequent great risk of communicating fire to the whole conveyer full of matches and sticks and to adjoining structures or the loss of matches and time and labor caused by preventive drenchings with water. For this purpose there are secured to said brackets 28 and 29 guides 107, extending across the front of said machine slightly below the plane of said punches. In said guides is slidably mounted a block 108. To the rearward face of said block is secured in any suitable manner a saw or knife 109 with its edge uppermost, and to the forward face of said block is secured in any suitable manner a retaining-plate 108$^a$. Said knife and plate impinge vertically upon the rear and forward faces of said guides, respectively, and the block is thus retained in said guides. A connecting-rod 110 is pivotally secured at one end, as at 110$^a$, to said block 108 and is pivotally secured at the opposite end to an eccentric pin 111, which is formed on a shaft 112, journaled in bearings of any suitable construction, carried by a bracket extension 107$^a$ of said guides. Upon the opposite end of said shaft is keyed a belt-wheel 113, adapted to engage a belt 114, which belt is continued under guide-wheels 115, journaled on a shaft 116, supported by said bracket 26, and thence around said belt-wheel 46. Said knife may thus be rapidly reciprocated and cuts off such finished matches as are left by said punches in the conveyer-bars, but itself leaves short stubs of such matches, which until their removal will prevent the insertion of new match-sticks in the apertures thus occupied. The machine may therefore be stopped and the front of the tilting table tilted up and the punch-cover removed and the defaulting punches properly adjusted or replaced by new punches.

While we have described certain details of construction, it is obvious that many such details may be modified or altered in minor particulars or by employing obvious equivalents, all within the scope and spirit of our said invention. It will be especially observed that the power-transmitting devices in our said construction are such that certain parts of the machine may be readily disconnected when not desired to operate without affecting the operation of other parts, thus saving power and avoiding unnecessary wear and tear, and that the parts are easily accessible for adjustment, repair, or replacement, thus saving time and labor.

Having now described our invention, what we claim, and desire to secure by Letters Patent, is—

1. In a match-making machine, the combination with a suitable support of a rock-shaft journaled thereon, a shelf journaled on said shaft and provided with guides upon its upper face, means for adjustably supporting the forward end of said shelf, a sliding frame mounted in said guides, a tilting table pivotally mounted in said frame and bearing upon said frame forward of the axis of said table, a latch adapted in operative position to support the rear end of said tilting table upon said frame, punches mounted on said tilting table and projecting forwardly beyond the forward edge of the same, a reciprocating rod, for retracting said frame, pivotally secured at one end to said frame and at the opposite end to an eccentric arm keyed to said shaft, a spring mounted on said reciprocating rod and bearing against said frame at one end and against said arm at the other end for yieldingly advancing said frame into operative position, and means for rocking said shaft, substantially as described.

2. In a match-making machine, the combination with a suitable support of a rock-shaft journaled thereon, a shelf journaled on said rock-shaft means for adjustably supporting the forward end of said shelf, a frame slidably mounted on said shelf, a tilting table pivotally mounted in said frame, a series of punches mounted on said tilting table, reciprocating means adapted to communicate motion from said rock-shaft to said frame, a shaft journaled on said support at an angle to the first said shaft, a cam-wheel keyed to the second said shaft, a lever keyed to said rock-shaft, a second lever pivoted to the first said lever and provided at one end with a transversely-extending pin adapted in operative position to engage the groove in said cam-wheel, means for locking said lever in operative or retracted positions, and means for rotating the second said shaft, substantially as described.

3. In a match-making machine the combination of a pusher comprising a reciprocating frame, a manually-controllable tilting table mounted thereon and punches mounted on said tilting table said tilting table being adapted in tilting position to throw said punches out of operating position.

4. In a match-making machine, the combination with a suitable support of a conduit-box mounted thereon, feed-rolls extending across said conduit-box and journaled in suitable bearings thereon, ratchet-wheels keyed to the axles of said feed-rolls at one side of said box, a rocking lever pivotally mounted on said side of said box centrally between said ratchet-wheels, pawls pivotally mounted on said rocker-arm and engaging said ratchet-wheels and adapted to rotate the upper said wheels in one direction and the lower said wheels in the opposite direction, a slide mounted upon said rocker-arm and provided with upwardly-extending arms and downwardly-extending hooks, adapted in operative position to disengage said pawls, means for rocking said lever, and means for arbitrarily operating said slide, substantially as described.

5. In a match-making machine the combination with a conduit-box, of feed-rolls extending across the same, ratchet-wheels keyed to the axles of said feed-rolls at one side of said box, a rocker-arm, pawls mounted on said rocker-arm for rotating said ratchet-wheels, a shaft journaled in bearings on a suitable support, a cam-wheel keyed to said shaft, a reciprocating arm provided at one end with a pin engaging the cam-groove in said cam-wheel, a radially-adjustable bearing-plate secured to the opposite end of said reciprocating rod and provided with guide flanges or ribs, a bearing-block slidably mounted between said flanges and engaging a pin extending from a lever formed on said rocker-arm for rocking said arm, substantially as described.

6. In a match-making machine, the combination of a conduit-box, feed-rolls journaled in bearings mounted thereon, ratchet-wheels keyed to the axles of said rolls, a rocker-arm pivotally supported on said box, pawls carried by said rocker-arm to engage and rotate said ratchet-wheels, means for disengaging said pawls including a slide mounted on said rocker-arm and provided with disengaging arms and hooks, a lever provided intermediate of its ends with a longitudinally-directed slot and pivoted at one end to a lever, extending from said rocker-arm, and provided at the opposite end with an operating-handle, a pin extending from said rocker-arm and engaging said slot, and means for locking the first said lever in operative position or in retracted position, substantially as described.

7. In a match-making machine, the combination of a conduit-box, provided with a groove in the lower edge of its forward end having a longitudinally-inclined plane formed on its floor, a wedge adapted to slide on said incline, a pin or punch carrying slide adapted to enter said groove from one end and extending transversely from said groove beyond the forward edge of said box and provided at its rearward edge with a horizontal groove adapted to receive said wedge, or wedge and inclined portion, and means for operating said wedge, substantially as described.

8. In a match-making machine, provided with a conveyer-belt adapted to carry matches extending perpendicularly to said belt, the combination of means extending transversely of said belt and parallel thereto for cutting the finished matches from said belt, and comprising guides mounted on a suitable support, a block slidably secured in said guides, a knife or cutting means secured to the face of said block opposing said belt, a reciprocating arm pivotally secured at one end to said block and at the opposite end to an eccentric pin extending from a shaft journaled in bearings on said support, and means for rotating said shaft, substantially as described.

9. In a match-making machine, the combination with a suitable support of a splint cutting and sticking mechanism, a match-ejecting mechanism, a splint and match carrying belt of connected links, axially-alined sprocket-wheels engaging said belt on the line of delivery to said belt of splints from said sticking mechanism and also engaging said belt on the line of entry into said belt of said ejecting mechanism, and means for effecting a rotary movement of said sprocket-wheels, substantially as described.

10. In a match-making machine, the combination with a suitable support of a splint cutting and sticking mechanism, a match-ejecting mechanism, a splint and match carrying belt of connected links, axially-alined sprocket-wheels engaging said belt on the line of the delivery to said belt of splints by said sticking mechanism and also engaging said belt on the line of the entry thereto of said ejecting mechanism, and means for effecting a regular intermittent rotary movement of said sprocket-wheels.

11. In a match-making machine the combination with a suitable support of a rock-shaft journaled thereon, a shelf pivotally supported at one end on said rock-shaft, means for supporting the opposite end of said shelf, a frame slidably mounted on said shelf, a series of punches carried by said frame, reciprocating means adapted to communicate motion from said rock-shaft to said frame, a rotatable shaft journaled on said support, a cam-wheel secured to said rotatable shaft, a lever secured to said rock-shaft, a second lever pivoted to first said lever and adapted in operative position to engage said cam-wheel, and means for rotating said rotatable shaft, substantially as described.

12. In a match-making machine, the combination with a suitable support, of a splint cutting and sticking mechanism, a match-ejecting mechanism, a splint and match carrying belt of connected links, axially-alined sprocket-wheels engaging said belt in the plane of the delivery to said belt of splints by said sticking mechanism, and also engaging said belt in the plane of the entry to said belt of said ejecting mechanism and adapted to control said belt between said points and prevent buckling of said belt at or between said points, and means adapted to prevent the disengagement of said belt from said wheels at said points, substantially as described.

13. In a match-making machine, the combination with a suitable support of a match and splint carrying belt; means including a gear-wheel as 29 for driving said belt; a match-ejecting mechanism; means including a lever 106ᵇ for driving said match-ejecting mechanism; means for operating said gear-wheel including a shaft 44 and a worm 47 keyed thereto, and means for operating said lever including said shaft 44 and a cam-wheel 48 keyed thereto, substantially as described.

14. The combination with a suitable support, of a match and splint carrying belt, sprocket-wheels engaging said belt for moving the same, a shaft, an adjustable connection between said shaft and said wheels for transmitting motion from said shaft to said wheels, a match-ejecting mechanism including a rock-shaft and a lever mounted on said rock-shaft, an operating device mounted on the first said shaft and adapted to engage and operate said lever.

15. The combination with a suitable support, of a splint and match carrying belt, wheels engaging said belt for moving the same, a shaft, a motion-transmitting device mounted on said shaft, an adjustable tired gear-wheel axially alined with each of the first said wheels and adapted to be engaged by said motion-transmitting device and to transmit motion therefrom to one of the first said wheels, a match-ejecting mechanism including a lever, means carried by said shaft for operating said lever, and means for rotating said shaft.

In testimony whereof we hereunto affix our signatures in presence of two witnesses.

JOHN W. LUNDGREN.
ALFRED J. BELL.

Witnesses:
JAMES T. WATSON,
WELLINGTON M. BLEWETT.